United States Patent [19]

Stroud

[11] 4,347,473
[45] Aug. 31, 1982

[54] DUAL ALTERNATOR POWER SYSTEM FOR MOTOR VEHICLE

[76] Inventor: Lebern W. Stroud, 3237 Gerome, Fort Worth, Tex. 76118

[21] Appl. No.: 33,443

[22] Filed: Apr. 26, 1979

[51] Int. Cl.³ .......................... H02J 7/14; H02J 1/00; H02J 3/00
[52] U.S. Cl. ........................................ 320/15; 307/16; 307/84; 320/61; 322/90
[58] Field of Search ......................... 320/6-8, 320/15-18, 61; 307/16, 76, 78, 84, 10 R, 87, 57; 322/90, 42, 88

[56] References Cited

U.S. PATENT DOCUMENTS

| | | | |
|---|---|---|---|
| 1,898,370 | 2/1933 | Hughes et al. | 320/6 X |
| 2,020,591 | 11/1935 | Temple | 322/95 X |
| 2,085,275 | 6/1937 | Schmidt | 320/6 X |
| 2,859,356 | 11/1958 | King | 307/84 X |
| 3,517,766 | 6/1970 | West | 290/16 X |
| 3,603,853 | 9/1971 | Mackay | 322/88 X |
| 3,763,415 | 10/1973 | Ownby | 320/16 X |
| 3,793,544 | 2/1974 | Baumgartner et al. | 320/17 |
| 4,045,718 | 8/1977 | Gray | 307/16 X |
| 4,141,613 | 2/1979 | Mori et al. | 320/64 X |
| 4,156,836 | 5/1979 | Wiley | 307/84 X |

FOREIGN PATENT DOCUMENTS 1151694 5/1969 United Kingdom ................. 320/15

Primary Examiner—Robert J. Hickey
Attorney, Agent, or Firm—Arthur F. Zobal

[57] ABSTRACT

In an emergency vehicle having dual batteries, one of which is employed for supplying power to the electrical system of the vehicle chassis and the other of which is employed for supplying power to the emergency equipment, dual alternators driven by the engine are provided for charging the batteries. The output of each alternator is connected to the input of its regulator and to both batteries whereby both alternators will be on at all times when the engine is running and will share the load on either or both batteries.

1 Claim, 6 Drawing Figures

DUAL ALTERNATOR POWER SYSTEM FOR MOTOR VEHICLE

BACKGROUND OF THE INVENTION

1. Field of the Invention

The present invention relates to an electrical power system for a motor vehicle and more particularly to an electrical power system for an emergency vehicle.

2. Description of the Prior Art

Most ambulances in operation known to the inventor have two batteries, one for supplying current to the electrical system of the vehicle chassis and one for supplying current to the emergency equipment carried by the ambulance. The maximum total load required by both systems may be up to 140-150 amps of current. These ambulances have had only a single alternator for maintaining both batteries. The highest rated alternator previously used and known to the inventor is capable of producing a maximum current output of only about 130 amps. Thus a severe power drain on the batteries occurs which requires the ambulance to be out of service frequently. Moreover, such systems are susceptible to battery or alternator failure and hence equipment failure thereby presenting serious problems to the patient.

SUMMARY OF THE INVENTION

It is an object of the present invention to provide a new electrical power system capable of effectively maintaining large power requirements of vehicles carrying electrical equipment and which provides a backup system in the event of alternator or battery failure.

It is a further object of the present invention to provide such an electrical power system for emergency vehicles capable of meeting the power requirements of the vehicle and its emergency equipment.

The electrical power system comprises two batteries one of which is coupled to the electrical system of the vehicle and the other of which is adapted to be coupled to the electrical equipment carried by the vehicle. Two alternators are provided for charging the batteries. The system allows both alternators to share the load. If one alternator fails, the other alternator will provide charging current to both batteries.

In a further aspect, isolators are provided for allowing current to flow only from the alternators to the batteries. In addition, each alternator is driven by a separate belt from the engine.

DESCRIPTION OF THE PREFERRED EMBODIMENTS

Figure 1:
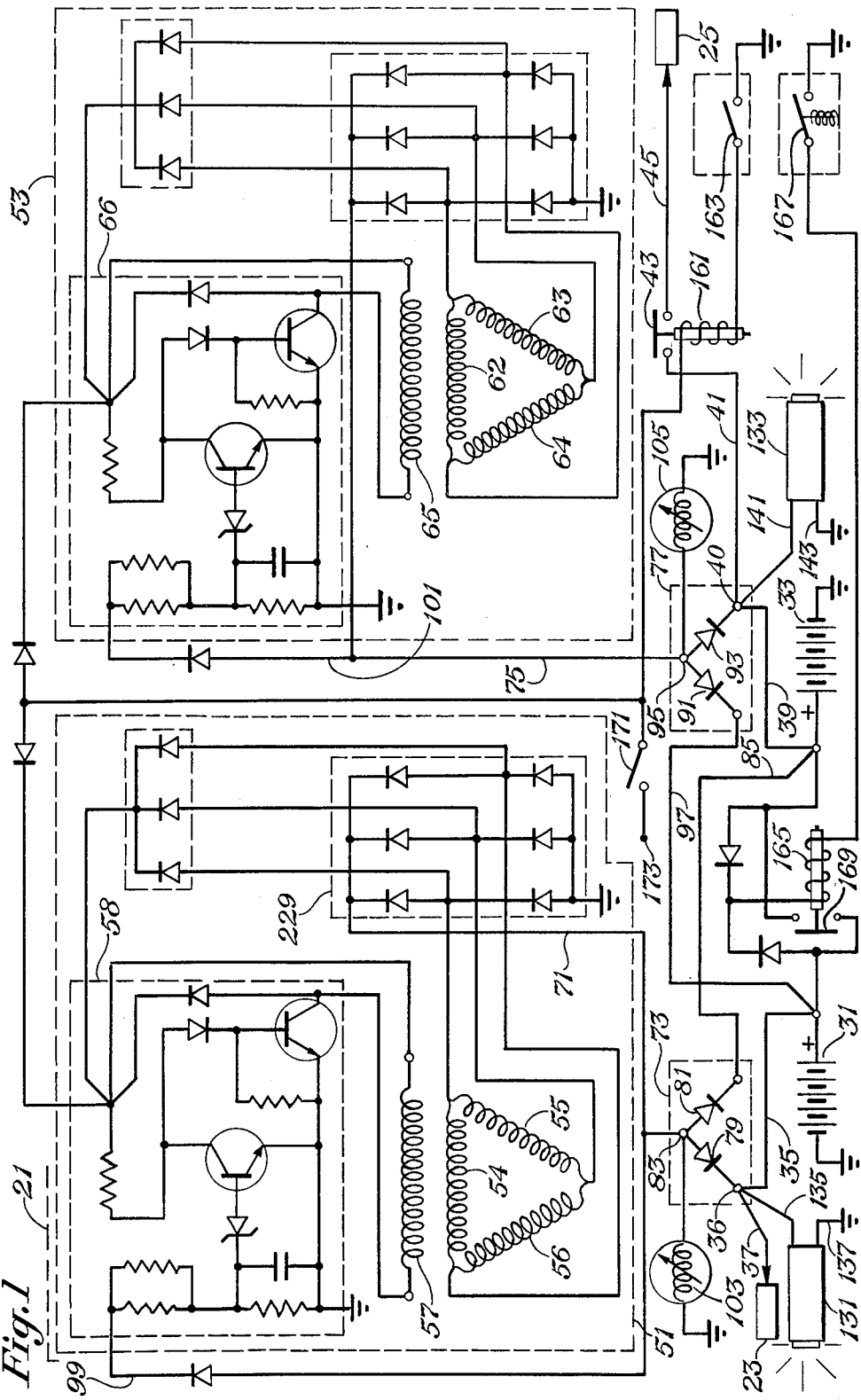
FIG. 1 is a schematic diagram of the present invention.

Referring to FIG. 1, dotted line 21 identifies an emergency vehicle such as an ambulance in which the present invention is employed. In FIG. 1, the vehicle chassis electrical system such as the lights, radio, heating and cooling system, starting circuit, ignition circuit, etc. is depicted by block 23. The electrically operated emergency equipment carried by the ambulance such as a heart machine, breathing equipment, vacuum pumps, lights, power outlets, etc. is depicted by block 25. The ambulance may be of the modular type comprising a module carried by the vehicle frame with the module carrying the emergency equipment.

In the system of FIG. 1, two twelve volt batteries 31 and 33 are provided for operating the chassis electrical system 23 and the emergency equipment 25. The plus terminal of battery 31 is coupled to the chassis electrical system 23 by way of lead 35 juncture 36 and lead 37. The plus terminal of battery 33 is coupled to the emergency equipment 25 by way of lead 39 juncture 40, lead 41, modual power relay switch 43, when closed, and lead 45.

Two alternators illustrated in dotted lines 51 and 53 are provided for maintaining the batteries 31 and 33 charged. Each alternator comprises a 3-phase delta winding for its stator core. In alternator 51, the three windings of the stator connected in a delta configuration are identified at 54, 55, and 56. The rotor coil is identified at 57. The regulator is shown in the dotted block 58. In alternator 53, three windings of the stator connected in a delta configuration are identified at 62, 63, and 64. The rotor coil is identified at 65. The regulator is shown in the dotted block 66.

The output lead 71 of the alternator 51 is coupled to the plus terminals of the batteries 31 and 33 by way of an isolator 73. The output lead 75 of the alternator 53 is coupled to the plus terminals of batteries 31 and 33 by way of an isolator 77. Isolator 73 comprises two diodes 79 and 81 having their anodes coupled together at juncture 83 to which the output 71 of alternator 51 is connected. The cathode of diode 79 is coupled to juncture 36 and hence by way of conductor 35 to the plus terminal of battery 31. The cathode of diode 81 is coupled to the positive terminal of battery 33 by way of electrical lead 85. Isolator 77 comprises two diodes 91 and 93 having their anodes coupled together at juncture 95 to which the output 75 of alternator 53 is connected. The cathode of diode 93 is coupled to juncture 40 and hence by way of electrical lead 39 to the plus terminal of battery 33. The cathode of diode 91 is coupled to the positive terminal of battery 31 by way of electrical lead 97.

The input lead 99 of regulator 58 is coupled to the output 71 of alternator 51 and the input lead 101 of regulator 66 is coupled to the output 75 of alternator 53.

With the system of FIG. 1 as described above wherein the output of each alternator is connected to the input of its regulator and to both batteries, both alternators will be on at all times while the engine is running and will share the load on either or both of the batteries. This allows the power requirements of the vehicle and its emergency equipment to be met and provides a balanced dual alternator system which results in longer alternator lifetime. Alternator lifetime further is increased by having both alternators on at all times while the engine is running. In this respect if an alternator is electrically turned off while the engine is running its rotor will continue to turn with no current to the rotor. This has been found to be undesirable since it results in premature deterioration of the brushes of the alternator and hence reduces the lifetime of the alternator. This problem is avoided by the present system. Moreover, with the present system, if one alternator should fail, the other alternator will supply current to both batteries thereby providing a backup system until the operator can get the ambulance into the shop to repair the inoperative alternator. Volt meters 103 and 105 located in the cab of the ambulance are coupled to the output leads 71 and 75 of alternators 51 and 53 respectively to allow the operator to monitor their voltage outputs.

As will be described subsequently, each of the alternators 51 and 53 has a stator coil which is wound with a unique coil configuration with a wire gauge size sufficient to produce a maximum current output of about 135 amps in one embodiment, a maximum current output of about 154 amps in a second embodiment, and a maximum current output of about 175 amps in a third embodiment. The vehicle chassis electrical system and emergency equipment of a large ambulance will draw a maximum total current load of about 150 amps. This load is approximately split between the vehicle chassis electrical system and the emergency equipment. Thus, under a maximum load, each of the alternators will operate at about fifty percent of capacity and hence will operate at a cooler temperature. This will minimize alternator break down resulting in a longer alternator life time.

Figure 2:
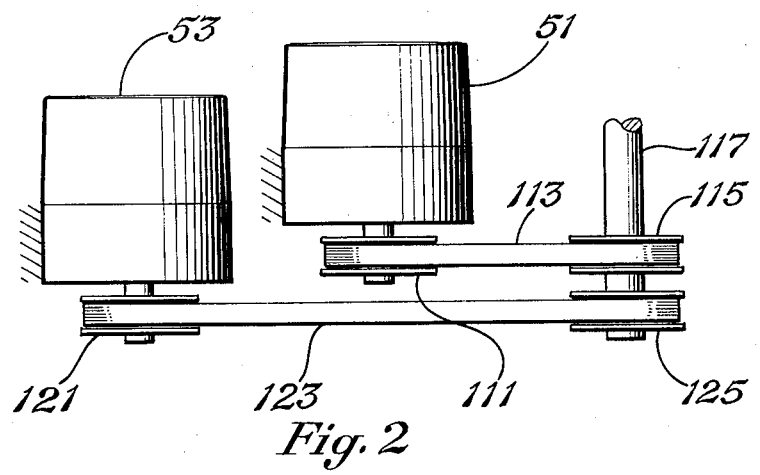
FIG. 2 illustrates two alternators driven by two separate belts coupled to the crank or drive shaft of the engine.

In order to minimize complete failure of the system in the event of belt breakage, each alternator is driven by a separate belt from the crank or drive shaft of the engine. Referring to FIG. 2, the rotor pulley 111 of alternator 51 is rotated by belt 113 and pulley 115, the latter of which is secured to the crank or drive shaft 117 of the vehicle engine. The rotor pulley 121 of alternator 53 is rotated by belt 123 and pulley 125, the latter of which is secured to the crank or drive shaft 117. With this arrangement, breakage of one of the belts will not result in a complete power failure since the other belt will continue to operate the other alternator which will supply current to both batteries until repairs are made.

The purpose of the diodes 79 and 81 of isolator 73 and diodes 91 and 93 of isolator 77 is to prevent the batteries from being discharged through the alternators by way of their output leads 71 and 75 in the event that a short to ground occurs in either of the alternators 51 or 53.

Two battery monitor lamps 131 and 133 are provided to allow the operator to monitor the condition of the batteries 31 and 33 respectively at all times even when the engine of the emergency vehicle is not running. These lamps are located in the cab of the vehicle.

In order for a conventional twelve volt battery to be fully charged, its output voltage at the plus terminal must be at about 12.6 volts. If the battery's output voltage falls below 12.6 volts, serious problems could result since the required electrical power will not be provided for the electrical system of the emergency vehicle chassis and its emergency equipment. Each of the monitor lamps 131 and 133 is constructed such that it will be off if its battery voltage is above about 12.2 volts and will be turned on if its battery voltage falls below about 12.2 volts. If the latter condition occurs, the operator is informed that the lamp's associated battery is down and needs charging or replacement or else the alternators are not producing enough output voltage to maintain the charge. Each of the lamps will monitor its battery at all times regardless of whether the engine is running or is off. Thus, when the vehicle is running or when the operator first enters the vehicle, he will be informed of the condition of the batteries. If either or both lamps are on, the operator will be informed that corrective action is necessary. For example, most ambulances have a throttle control for controlling the rpm of the engine while idling. If an operator drives to a building and leaves the engine idling while he goes into the building ie, for emergency purposes, and if one or both lamps turn on, then he knows that the batteries are in a discharging condition and corrective action can be taken by adjusting the throttle to increase the rpm of the engine until the lamps turn off.

As shown in FIG. 1, lead 135 of monitor lamp 131 is coupled to the plus terminal of battery 31 by way of juncture 36 and lead 35 and its other lead 137 is coupled to ground. Lead 141 of monitor lamp 133 is coupled to the positive terminal of battery 33 by way of juncture 40 and lead 39 and its other lead 143 is coupled to ground.

Figure 3:
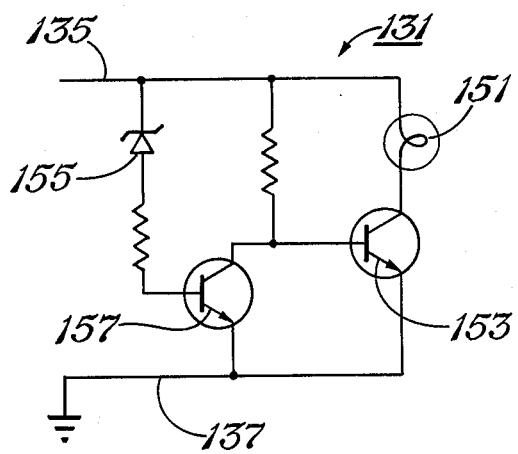
FIG. 3 is an electrical diagram of a battery monitor lamp.

Each of the monitor lamps 131 and 133 is identical. Reference is now made to FIG. 3 for a detailed description of the monitor lamp 131. A forty milliamp bulb 151 is connected to lead 135 and to transistor 153 which is connected to ground lead 137. A Zenor diode 155 is connected to lead 135 and to the base of a transistor 157. This transistor is connected to the base of transistor 153 and to ground lead 137. Zenor diode 155 breaks down at about 12.2 volts. When the voltage of battery 31 and hence across leads 135 and 137 is greater than about 12.2 volts, Zenor diode 155 breaks down and conducts current. This turns transistor 157 on which turns transistor 153 off. Thus, the bulb 151 is off under these conditions. When the battery voltage falls below about 12.2 volts, Zenor diode 155 becomes non-conductive and transistor 157 turns off and transistor 153 turns on. This causes bulb 151 to turn on informing the operator of the down condition of the battery. The circuitry including the two transistors 151 and 157, the Zenor diode 155 and the two resistors are molded together as one unit 131. The leads 135 and 137 extend out of the unit for attachment to the desired terminals. Monitor lamp 133 operates in the same manner for monitoring the condition of battery 33.

Referring again to FIG. 1, other components of the system comprises a module power relay coil 161 operated by a power switch 163 and a fail safe relay 165 operated by a fail safe switch 167. Switches 163 and 167 are located in the cab of the ambulance. In an emergency situation, power switch 163 is closed energizing relay coil 161 which closes relay switch 43. This applies power to the emergency equipment 25. When the ambulance is out of service, the operator will open switch 163 which causes relay coil 161 to be deenergized, opening switch 43.

The purpose of the fail-safe relay 165 and switch 167 is to connect the two batteries 31 and 33 together in the event that one of them fails or is severely down whereby power will be available for the system of the dead battery. For example, if battery 31 is dead and the engine will not start, the operator can obtain starting power by closing switch 167 to energize relay 165. This closes normally open switch 169 to connect the plus terminal of battery 33 with the plus terminal of battery 31.

In FIG. 1, reference numeral 171 identifies the ignition switch of the vehicle. Terminal 173 is connected to the plus terminal of battery 31.

Figure 4:
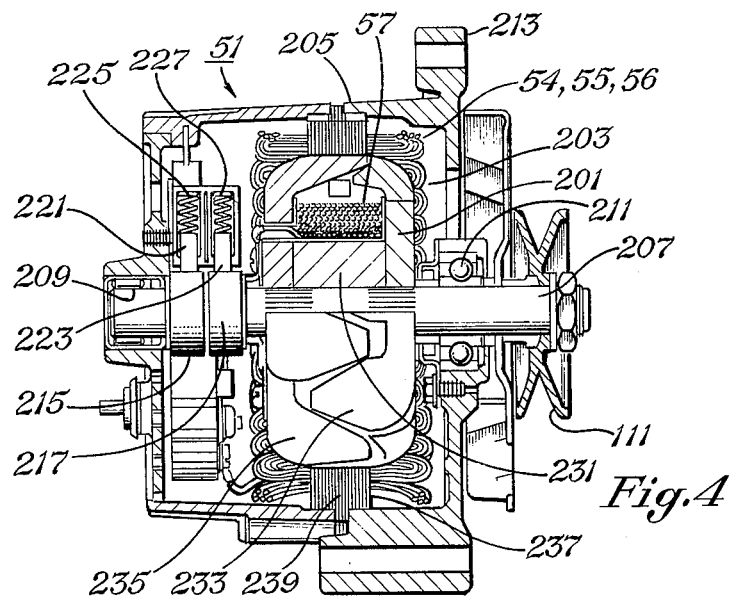
FIG. 4 is a cross-section of an alternator.
Figure 6:
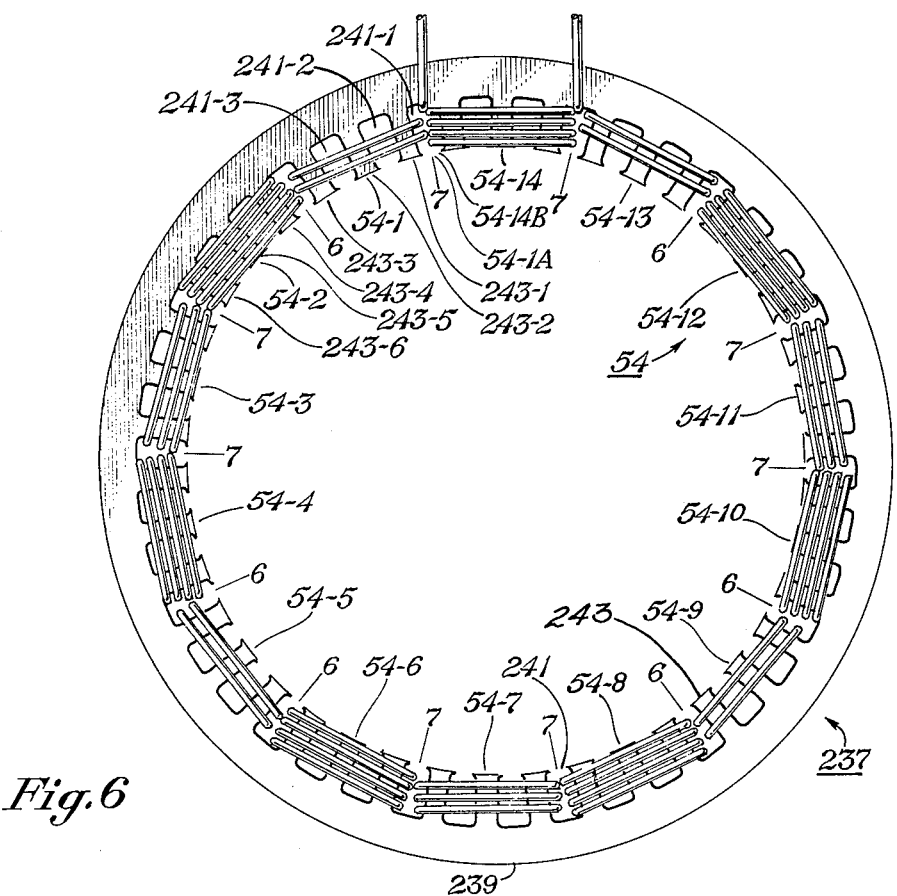
FIG. 6 is a plan view of the stator core of an alternator with the coil winding of FIG. 5 installed around its segments.
Figure 5:
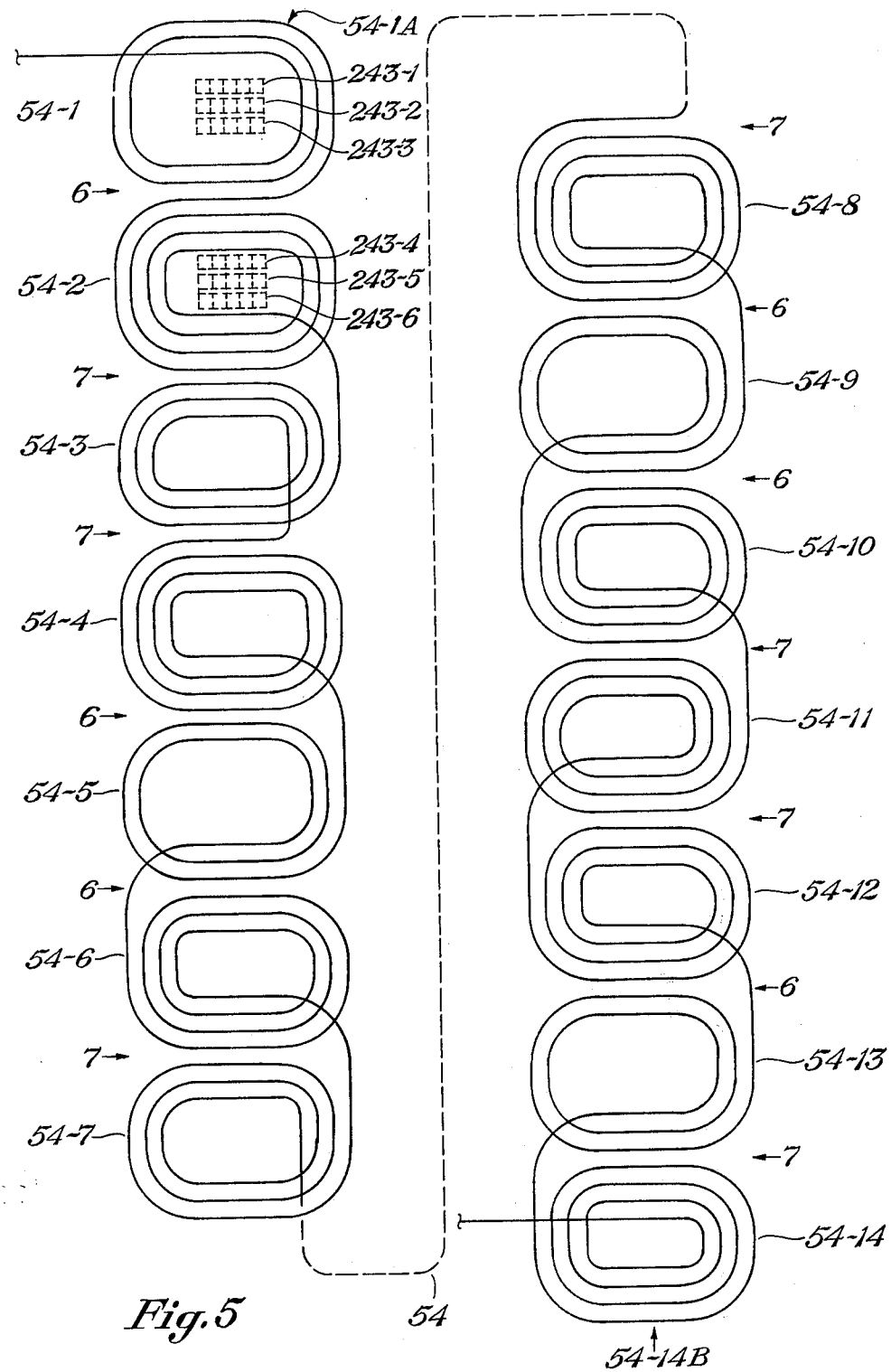
FIG. 5 illustrates the preferred coil winding configuration of one phase of the alternators used in the system of FIG. 1.

Referring now to FIGS. 4-6 there will be described one of the alternators with its unique coil winding configuration which preferably is of the type used for the dual alternators of the system of FIG. 1. In FIG. 4, the alternator shown is indicated to be alternator 51. Alternator 53 will be constructed in the same manner as alternator 51. As shown in FIG. 4, the alternator 51 comprises a rotor 201 and a stator 203, the latter of which is fixedly carried by a housing or case 205. Rotor 201 is rotatably carried by the case by a shaft 207 which is journalled by roller bearings 209 and ball bearings 211 to the case 205. Brackets 213 formed to the case 205 are adapted to receive bolts for coupling the alternator to mounting means adjacent the engine of the vehicle. The pulley 111 is mounted to the shaft 207 for receiving the belt from the engine for rotating the rotor 201.

Shaft 207 has two slip rings 215 and 217 mounted ridgidly to it and insulated from each other and from the shaft. Slip rings 215, 217 are connected by conductors (not shown) to the coil 57 of rotor 201. Carbon brushes 221 and 223 are biased by springs 225 and 227 into sliding contact with the slip rings 215 and 217. Slip rings 215, 217 and brushes 221, 223 provide a connection for applying a D.C. exciting voltage to the rotor 201. A diode rectifier bridge 229 (see FIG. 1) is attached to the inner side of the case 205 and is connected by conductors to the windings 54-56 of the stator 203 for converting the A.C. output to D.C.

Rotor 201 comprises a ferro-magnetic core 231 which is wound with conductive wire defining the rotor coil 57. The opposite sides of the core 231 have end portions which form north and south poles 233 and 235. The poles are formed into seven north poles and seven south poles which extend inward and mesh, but do not touch, with a corresponding pole of the opposite polarity.

Stator 203 comprises an annular core 237 formed of a plurality of stacked ferro-magnetic plates 239. A plan view of the core 237 is shown in FIG. 6. As seen in this figure, there are forty-two slots 241 formed in the stator core 237. Slots 241 extend parallel to the axis of the core 237 the full width of the core.

In the preferred embodiment, the depth of the slots 241 is slightly more than one half of the radial thickness of the core. The core 237 is approximately 5¼ inches in outside diameter, ¾ of an inch wide longitudinally and 9/16 of an inch thick radially. The slots 241 are approximately 5/16 of an inch deep, being 1/16 of an inch wide at the entrance and ¼ of an inch wide at the inner portion. The forty two portions of the core between the slots 241 are defined as segments 243. Rotor 201 is carried within the stator core 237, with the poles 233 and 235 being approximately 0.03 of an inch from segments 243.

The three stator windings 54-56 each comprise fourteen loops or coils which are located in the slots 241 of the core 237. Each coil or loop of each winding encircles three segments 243 of the core. Electrically insulating inserts (not shown) are located in the slots between their wall structure and their wires to prevent electrical contact between the wires and the core. The stator windings are connected in a delta configuration as shown in FIG. 1 in the dashed block 51 which is an electrical schematic of the alternator.

Except for the delta winding connection, the alternator as described above is similar to a commercially available alternator manufactured by Delco-Remy, a division of General Motors. The Delco alternator uses 15-20 A.W.G. (American Wire Gage) for its three coil windings which are connected in a Y configuration rather than a delta. Each coil of each winding encircles three segments of the core. Adjacent coils of each winding have totally eight turns located in every third slot of the stator core. For a given winding, each coil at one edge has four turns and at the opposite edge adjacent coils have five and three turns. The Delco alternator produces a maximum of about sixty-three amps of current. References made to Buchsbaum's Complete Hand-Book of Practical Electronic Reference Data, by William Buchsbaum (Prentice-Hall, Inc., 1978) for conversion from A.W.G. to inches.

The preferred alternator used in the system of FIG. 1 has a unique coil winding configuration for each of its three coil windings which results in the production of much higher current output than other known alternators. This unique coil winding configuration is shown in FIGS. 5 and 6. Thirteen A.W.G. (American Wire Gage) copper wire is used to form the windings which are connected together in a delta configuration.

Referring to FIGS. 5 and 6, the unique coil winding configuration will be described. The coil winding in these figures is for one phase and it is identified as winding 54 of alternator 51. The coil winding configuration for the other two phases, coil windings 55 and 56 is the same as that of coil winding 54. As seen in FIG. 5, the outer edge 54-1A of coil 54-1 has three turns of wire. The outer edge 54-14B of coil 54-14 has four turns of wire. The total turns formed between adjacent coils from adjacent coils 54-1 and 54-2 to adjacent coils 54-13 and 54-14 are as follows: 6, 7, 7, 6, 6, 7, 7, 6, 6, 7, 7, 6, 7. The turns of the left-hand edges of coils 54-1 to 54-14 as seen in FIG. 5 are as follows: 2, 4, 3, 4, 2, 4, 3, 4, 2, 4, 3, 4, 2, 4. The turns of the right-hand edges of coils 54-1 to 54-14 as seen in FIG. 5 are as follows: 3, 3, 4, 3, 3, 3, 4, 3, 3, 3, 4, 3, 3, 4.

In the stator core of FIG. 6, edges 54-1A and 54-14B of the coil winding 54 are located in slot 241-1. Starting with slot 241-1 and going counterclockwise, it can be seen that every third slot has the following number of turns of winding 54 located therein: 7,6, 7,7, 6, 6, 7, 7, 6, 6, 7, 7, 6, 7.

In FIG. 6, only the edge of the coil winding 54 having the turns 2, 4, 3, 4, 2, 4, 3, 4, 2, 4, 3, 4, 2, 4 is shown. In FIG. 5, core segments 241-1, 243-2, and 243-3 encircled by coil 54-1 and core segments 243-4, 243-5, and 243-6 encircled by coil 54-2 are depicted by dotted lines. In FIG. 5, the relative distance between segments 243-3 and 243-4 is exagerated for purposes of clarity.

Each of the coil windings 55 and 56 is the same as coil winding 54. The turns of adjacent coils of windings 55 will be located in every third slot starting with slot 254-2 and going counterclockwise. The outer edges of the outer coils of winding 55 will be located in slot 241-2. Thus starting with slot 241-2 and going counterclockwise, every third slot will have the following number of turns of winding 55 located therein: 7, 6, 7, 7, 6, 6, 7, 7, 6, 6, 7, 7, 6, 7. With the turns of the coils so located in every third slot, each coil or loop of winding 55 will encircle three segments 243. The turns of adjacent coils of winding 56 will be located in every third slot starting with slot 241-3 and going counterclockwise. The outer edges of the outer coils of winding 56 will be located in slot 241-3. Thus starting with slot 241-3 and going counterclockwise, every third slot will have the following number of turns from winding 56 located therein: 7, 6, 7, 7, 6, 6, 7, 7, 6, 6, 7, 7, 6, 7. With the turns of coil 56 so located in every third slot, each coil or loop of winding 56 will encircle three segments 243.

The alternator as described above and having the three winding configurations as described in conjunction with FIGS. 5 and 6, connected in a delta and formed of thirteen A.W.G. copper wire produces a maximum current of about 135 amps. The rotor used is a 3.5 ohm rotor. In addition to the coil winding configuration of FIGS. 5 and 6, the delta connection and the thirteen A.W.G. wire also helps to increase the current output of the alternator. Tests have shown that the alternator will produce 60 amps at an engine idle speed of approximately 700-900 rpm and up to 135 amps at an engine speed of 2,000 rpm based on a three to one ratio between the crank pulley and the alternator pulley using a two inch pulley on the alternator.

The Delco regulator 58 and diode bridge 229 are internally located within the casing 205. They limit the output current to about 135 amps. By using a different regulator and diode bridge located externally of the case 205, the current output of the alternator (using the coil configuration of FIGS. 5 and 6 for the three phase windings connected in a delta and formed of thirteen A.W.G. wire) can be increased to 154 amps. The current output can be increased even further to about 175 amps by increasing the turns and hence the resistance of the rotor.

Although not shown, a resistor may be connected between the plus terminal of battery 31 and the input lead 99 of regulator 58 on the anode side of the diode shown in the input lead 99. The resistor will be used with a new type of regulator to turn the regulator on. A similar resistor may be connected between the plus terminal of battery 33 and the input lead 101 of regulator 66 on the anode side of the diode shown in the input lead 101 for the same purpose.

Although an alternator having the coil winding configuration of FIGS. 5 and 6 is preferred for use in the system of FIG. 1, it is to be understood that other types of alternators may be employed.

I claim:
1. In a motor vehicle which includes an engine and electrically operated means employed in the operation of said vehicle and which carries electrically operated equipment used for emergency purposes, an electrical power system, comprising:
  a first battery having a positive terminal coupled to said electrically operated means,
  a second battery having a positive terminal adapted to be coupled to said electrically operated equipment,
  first alternator means driven by the engine of said motor vehicle and having an output lead,
  first and second electrical leads coupled to said output lead of said first alternator means and to said positive terminals of said first and second batteries respectively,
  first and second diode means coupled to said first and second electrical leads respectively for allowing the flow of current in a direction only from said output lead of said first alternator means to said first and second electrical leads,
  second alternator means driven by the engine of said motor vehicle and having an output lead,
  third and fourth electrical leads coupled to said output lead of said second alternator means and to said positive terminals of said first and second batteries respectively,
  third and dourth diode means coupled to said first and second electrical leads respectively for allowing the flow of current in a direction only from said output lead of said second alternator means to said third and fourth electrical leads,
  first regulator means for regulating the electrical voltage applied to said first alternator means, said first regulator means having an input coupled to said output lead of said first alternator means,
  second regulator means for regulating the electrical voltage applied to said second alternator means, said second regulator means having an input coupled to said output lead of said second alternator means.

* * * * *